(12) United States Patent
Grant et al.

(10) Patent No.: US 10,488,926 B2
(45) Date of Patent: Nov. 26, 2019

(54) METHOD AND APPARATUS FOR PROVIDING A FIXED RELIEF TOUCH SCREEN WITH LOCATING FEATURES USING DEFORMABLE HAPTIC SURFACES

(75) Inventors: Danny A. Grant, Laval (CA); Juan Manuel Cruz-Hernandez, Montreal (CA)

(73) Assignee: Immersion Corporation, San Jose, CA (US)

(*) Notice: Subject to any disclaimer, the term of this patent is extended or adjusted under 35 U.S.C. 154(b) by 936 days.

(21) Appl. No.: 11/943,862

(22) Filed: Nov. 21, 2007

(65) Prior Publication Data

US 2009/0128503 A1  May 21, 2009

(51) Int. Cl.
G06F 3/01 (2006.01)
G06F 3/0488 (2013.01)

(52) U.S. Cl.
CPC .......... *G06F 3/016* (2013.01); *G06F 3/04886* (2013.01); *G06F 2203/04809* (2013.01)

(58) Field of Classification Search
USPC ........................................ 345/173
See application file for complete search history.

(56) References Cited

U.S. PATENT DOCUMENTS

| | | | |
|---|---|---|---|
| 6,429,846 B2 | 8/2002 | Rosenberg et al. | |
| 6,822,635 B2 | 11/2004 | Shahoian et al. | |
| 7,245,292 B1* | 7/2007 | Custy | 345/173 |
| 7,382,357 B2* | 6/2008 | Panotopoulos | G06F 3/0202 345/168 |
| 2002/0158836 A1* | 10/2002 | Ishmael, Jr. | H01L 27/3244 345/100 |
| 2003/0179190 A1* | 9/2003 | Franzen | 345/173 |
| 2006/0119586 A1* | 6/2006 | Grant et al. | 345/173 |
| 2007/0182718 A1* | 8/2007 | Schoener et al. | 345/173 |
| 2007/0229233 A1* | 10/2007 | Dort | 340/407.1 |
| 2007/0236450 A1* | 10/2007 | Colgate et al. | 345/156 |
| 2008/0132313 A1* | 6/2008 | Rasmussen et al. | 463/16 |
| 2008/0252607 A1* | 10/2008 | De Jong et al. | 345/173 |
| 2008/0297475 A1* | 12/2008 | Woolf | G06F 3/0233 345/163 |
| 2008/0303795 A1* | 12/2008 | Lowles et al. | 345/173 |
| 2009/0002328 A1* | 1/2009 | Ullrich et al. | 345/173 |

OTHER PUBLICATIONS

International Preliminary Report on Patentability as issued for PCT/US2008/075447, dated Jun. 3, 2010.

* cited by examiner

*Primary Examiner* — William Boddie
*Assistant Examiner* — Jeffrey Parker
(74) *Attorney, Agent, or Firm* — Kilpatrick Townsend & Stockton LLP

(57) ABSTRACT

A method and apparatus for an electronic interface device capable of providing a fixed relief touch screen with locating features using deformable haptic surfaces are disclosed. The device, in one embodiment, includes a haptic mechanism and a touch-sensitive surface. The haptic mechanism provides haptic feedback in response to an activating command. The touch-sensitive surface is capable of changing its surface texture from a first surface characteristic to a second surface characteristic in response to the haptic feedback. For example, the first surface characteristic may be coarse texture while the second surface characteristic may be smooth texture.

31 Claims, 13 Drawing Sheets

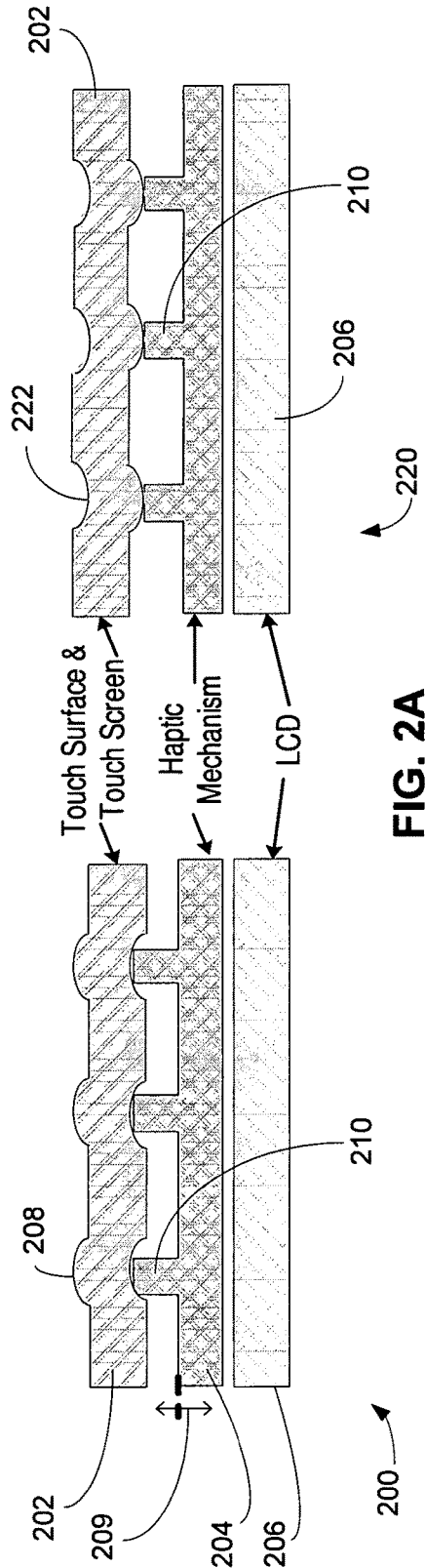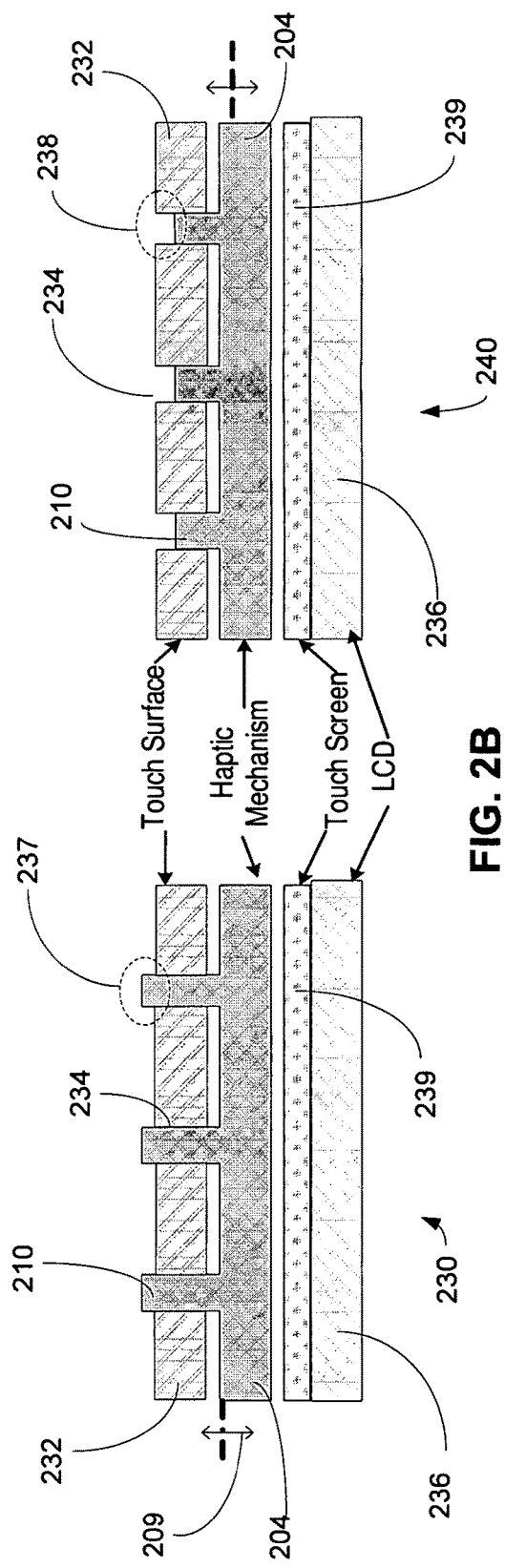
FIG. 2A
FIG. 2B

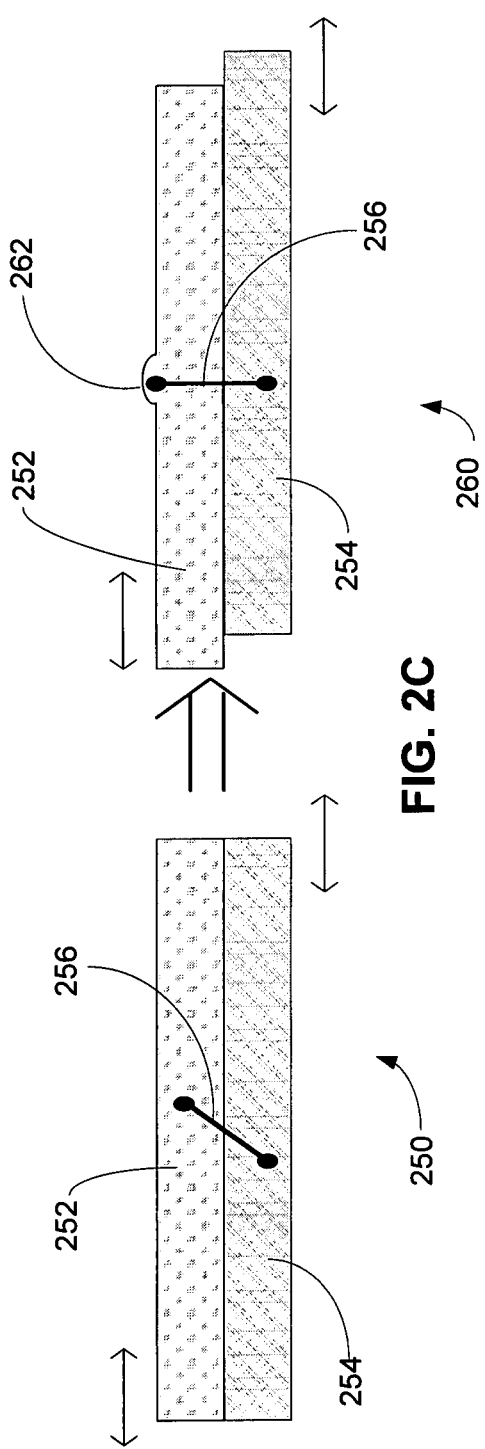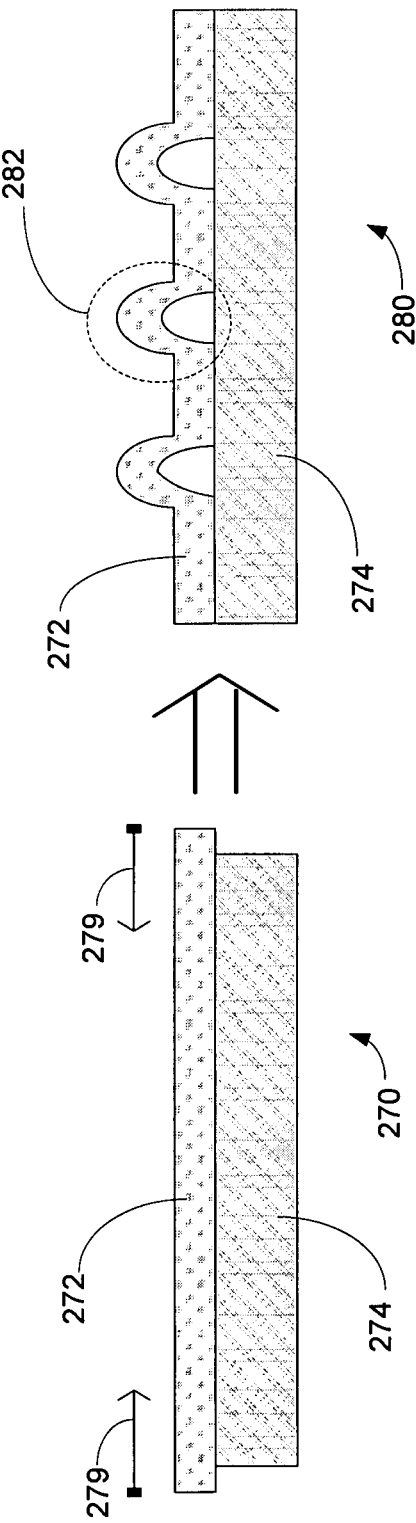

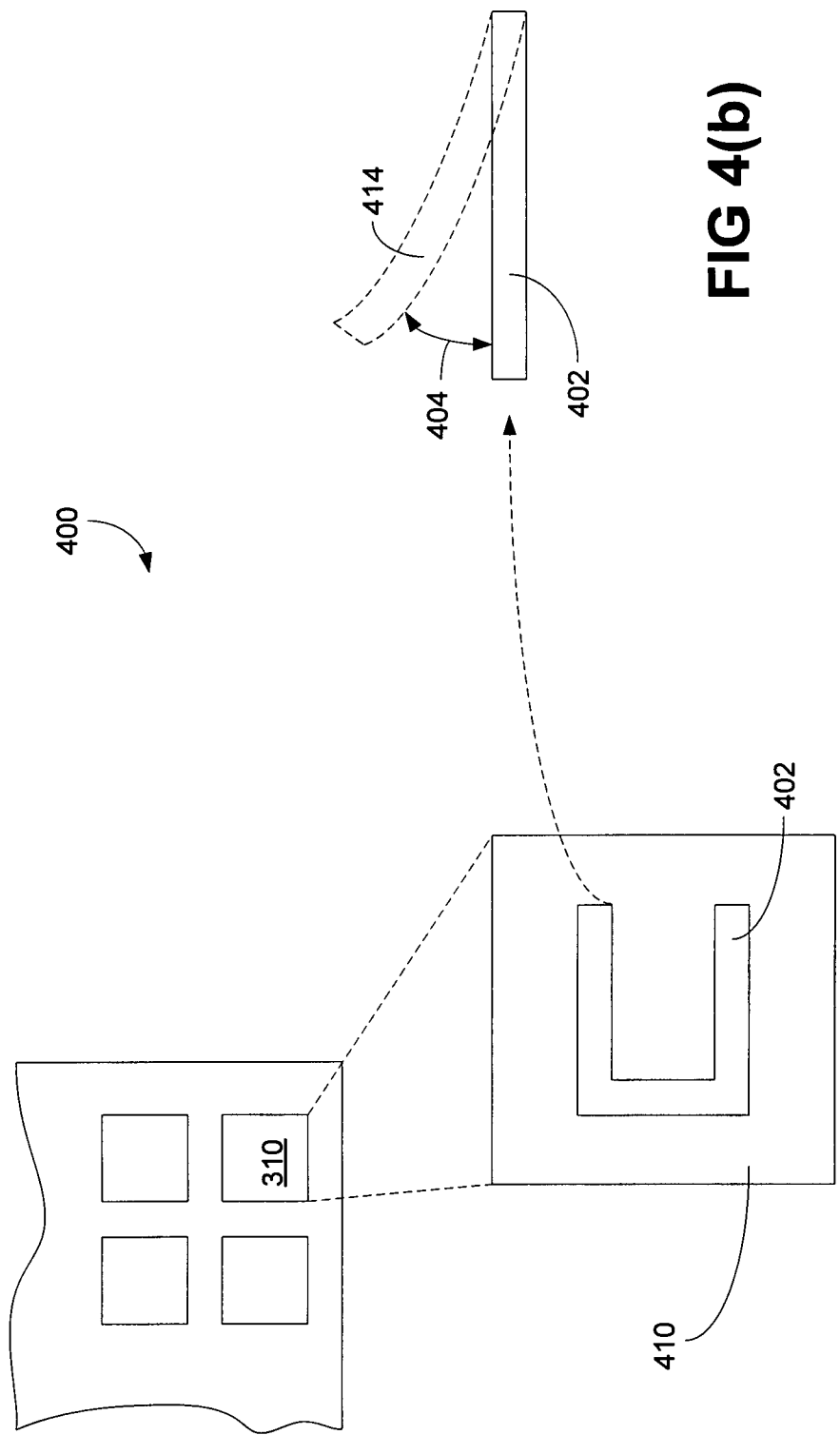

METHOD AND APPARATUS FOR PROVIDING A FIXED RELIEF TOUCH SCREEN WITH LOCATING FEATURES USING DEFORMABLE HAPTIC SURFACES

FIELD

The exemplary embodiment(s) of the present invention relates to a field of electronic interface devices. More specifically, the exemplary embodiment(s) of the present invention relates to a user interface device with haptic feedback.

BACKGROUND

As computer-based systems, appliances, automated teller machines, point of sale terminals and the like have become more prevalent in recent years, the ease of use of the human-machine interface is becoming more and more important. Such interfaces should operate intuitively and require little or no training so that they may be used by virtually anyone. Many conventional user interface devices are available on the market, such as the key board, the mouse, the joystick, and the touch screen. One of the most intuitive and interactive interface devices known is the touch panel, which can be a touch screen or a touch pad. A touch screen includes a touch-sensitive input panel and a display device, usually in a sandwich structure and provides a user with a machine interface through touching a panel sensitive to the user's touch and displaying content that the user "touches." A conventional touch pad is a small planar rectangular pad, which can be installed near a display, on a computer, an automobile input device, and the like.

A conventional touch-sensitive panel typically has a smooth flat surface and uses sensors such as capacitive sensors and/or pressure sensors to sense locations being touched by a finger(s) and/or an object(s). For example, a user presses a region of a touch screen commonly with a fingertip to emulate a button press and/or moves his or her finger on the panel according to the graphics displayed behind the panel on the display device. Once the input(s) are sensed, the sensed input(s) are forwarded to a processor for processing.

A problem associated with the conventional touch-sensitive panel is that it does not provide relief information to the user. For example, a typical touch-sensitive panel has a smooth and flat surface and consequently, a user can not feel the edge(s) of a button. Another problem associated with the conventional touch-sensitive panel is the inability to provide input confirmation when a user enters an input. For example, when a user presses a location on a conventional touch-sensitive panel, the panel typically does not have the capability to confirm the selected input instantaneous. As such, lack of locating features such as buttons and lack of input confirmation information are drawbacks associated with a typical conventional touch-sensitive panel.

SUMMARY

A method and an electronic interface device capable of providing fixed relief information on a touch panel with locating features are disclosed. The device, in one embodiment, includes a haptic mechanism and a touch-sensitive surface. The haptic mechanism provides haptic feedback in response to an activating command. The activating command can be initiated by a user or a logic device. The touch-sensitive surface is capable of changing its surface texture from a first surface characteristic to a second surface characteristic in response to the activating command. For example, the first surface characteristic may include a coarse texture while the second surface characteristic may include a smooth texture. In an alternative embodiment, the touch-sensitive surface includes a touch surface layer and a touch screen layer, wherein the touch screen layer senses inputs from touching.

Additional features and benefits of the exemplary embodiment(s) of the present invention will become apparent from the detailed description, figures and claims set forth below.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

FIG. 2A is a cross-section diagram illustrating an interface device having a deformable haptic surface on a touch screen in accordance with one embodiment of the present invention;

FIG. 2B is a cross-section diagram illustrating an interface device capable of providing locating features using a set of openings on a touch screen in accordance with one embodiment of the present invention;

FIG. 2C is a cross-section diagram illustrating an interface device employing a lateral displacement haptic mechanism to provide locating features in accordance with one embodiment of the present invention;

FIG. 2D is a cross-section diagram illustrating a deformable haptic surface employing a push and pull haptic mechanism to provide locating features in accordance with one embodiment of the present invention;

FIG. 4(a-b) is a diagram illustrating another embodiment of a haptic cell using Micro-Electro-Mechanical Systems ("MEMS") device to generate haptic effects in accordance with one embodiment of the present invention;

DETAILED DESCRIPTION

Exemplary embodiments of the present invention are described herein in the context of a method, system and apparatus for providing fixed relief information to a touch screen with locating features using a deformable haptic surface.

Those of ordinary skilled in the art will realize that the following detailed description of the exemplary embodiment(s) is illustrative only and is not intended to be in any way limiting. Other embodiments will readily suggest themselves to such skilled persons having the benefit of this disclosure. Reference will now be made in detail to implementations of the exemplary embodiment(s) as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skilled in the art having the benefit of this disclosure.

An interface device capable of providing a fixed relief touch panel with locating features using deformable haptic surfaces is disclosed. The device, in one embodiment, includes a haptic mechanism and a touch-sensitive surface. The haptic mechanism provides haptic feedback in response to an activating command. The activating command can be initiated by a user or a logic device. The touch-sensitive surface is capable of changing its surface texture or surface relief from a first surface characteristic to a second surface characteristic in response to the haptic feedback. For example, the first surface characteristic may include a coarse texture while the second surface characteristic may include a smooth texture. A function of the exemplary embodiment(s) of the present invention is to provide fixed relief information of a touch panel to a user(s) when the device is activated. It should be noted that the mechanism of providing a deformable-fixed relief surface is applicable to smooth flat surfaces or coarse non-flat surfaces.

Figure 1A:
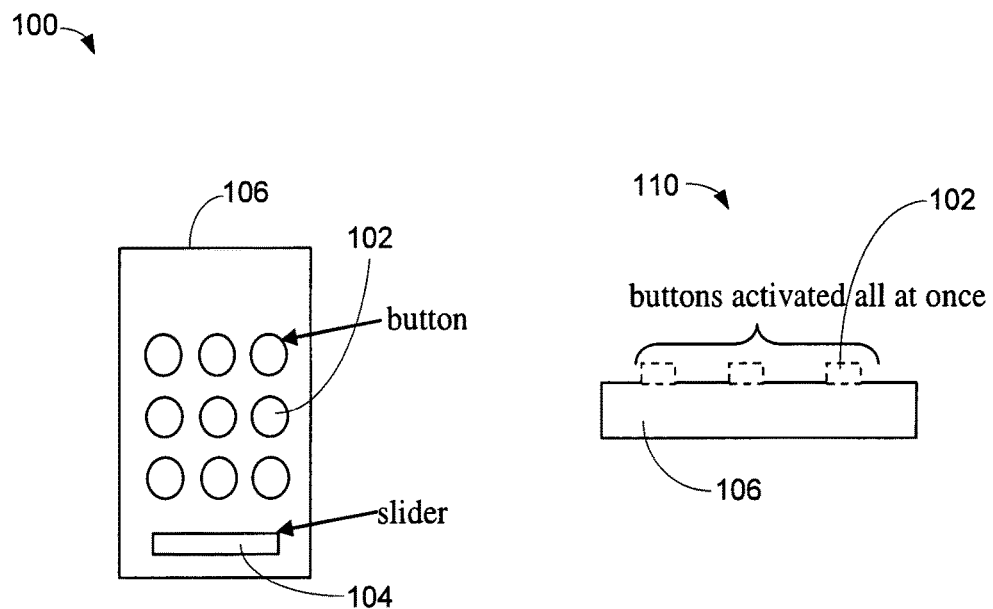
FIG. 1A is a block diagram illustrating a fixed relief display having one or more programmable relief functionalities in accordance with one embodiment of the present invention.

FIG. 1A is a block diagram 100 illustrating a fixed relief display having one or more programmable relief functionalities in accordance with one embodiment of the present invention. Diagram 100 illustrates a top view of an interface device 106 having a location pattern illustrating buttons and sliders. Diagram 110 is a side view or cross-section view of interface device 106, which illustrates a coarse textured deformable surface with a pattern of raising shaped features 102. Interface device 106, in this example, includes a set of nine (9) buttons 102 and a slider 104. When interface device 106 is activated, various predefined areas 102 begin to rise emulating physical edges of buttons and slider 104. In an alternative embodiment, device 106 includes different input objects with different shapes such as bars, keys, balls, rings, and the like. It should be noted that interface device 106 can be used as a user interface device for a cellular phone, a personal digital assistant ("PDA"), an automotive data input system, and so forth.

Interface device 106 provides a pattern of locating features as relief information, which assists a user to pinpoint exactly where to press on a touch-sensitive surface. Interface device 106, in one embodiment, uses one or more actuator(s) to activate the pattern of locating features. When the actuator(s) is activated, the surface of interface device 106 forms relief information with a pattern of locating features. The surface of interface device 106, however, returns to its smooth surface when the actuator is deactivated. It should be noted that a function of the one embodiment of the present invention is to allow an interface device to form a pattern of locating features when it is desirable. It should be noted that the underlying concept of the exemplary embodiment of the present invention would not change if one or more blocks or layers were added to or removed from device 106.

The haptic mechanism, in one embodiment, is operable to provide haptic feedback in response to an activating command, and a touch-sensitive surface is capable of changing its surface characteristic from coarse texture to smooth texture or vice versa. The haptic mechanism provides multiple tactile or haptic feedbacks wherein one tactile feedback may be configured to be used for surface deformation, such as by emulating buttons, while another tactile feedback is configured to be used for input confirmation, such as through generating a vibration. The haptic mechanism, for example, may be implemented by various techniques, such as vertical displacement, lateral displacement, push/pull technique, air/fluid pockets, local deformation of materials, resonant mechanical elements, and the like.

Vertical displacement, in one embodiment, includes a set of pins, wherein the pins are configured to move in a vertical direction between layers such as a touch surface layer and a display layer. The lateral displacement of haptic mechanism, on the other hand, employs a lateral displacement mechanism to create a coarse textured surface and/or a smooth textured surface in response to the lateral direction of movement of the layers to be shifted. Other haptic mechanisms for generating haptic feedbacks are available, such as air-pockets haptic mechanisms, piezoelectric materials, and the like. It should be noted that the haptic mechanism may include multiple cells or regions wherein each cell or region can be independently controlled or activated. Interface device 106 illustrated in FIG. 1A is a single region configuration.

The touch-sensitive surface, for example, may be a flexible and/or deformable surface, which is capable of sensing finger touches or contacts on the surface. The surface texture or surface relief of the touch-sensitive surface, in one embodiment, can change from coarse to smooth texture or vice verse. The terms surface texture and surface relief are used interchangeably herein. The coarse texture or condition, for example, emulates a sensation of a button edge(s) when a user touches a bump on the surface. The coarse texture can also create a sensation of a key, a hole, and the like. The haptic feedback can also provide a click sensation when a button is being pressed. An alternatively embodiment, touch sensitive surface of interface device 106 provides a kinesthetic button, which is capable of actually moving away from user's finger when certain force from the finger is applied to a button-like bump. The surface having a smooth texture indicates that the touch surface is free from irregularities, projections, and/or roughness. It should be noted that the kinesthetic button is also capable of vibrating for input confirmation.

Figure 1B:
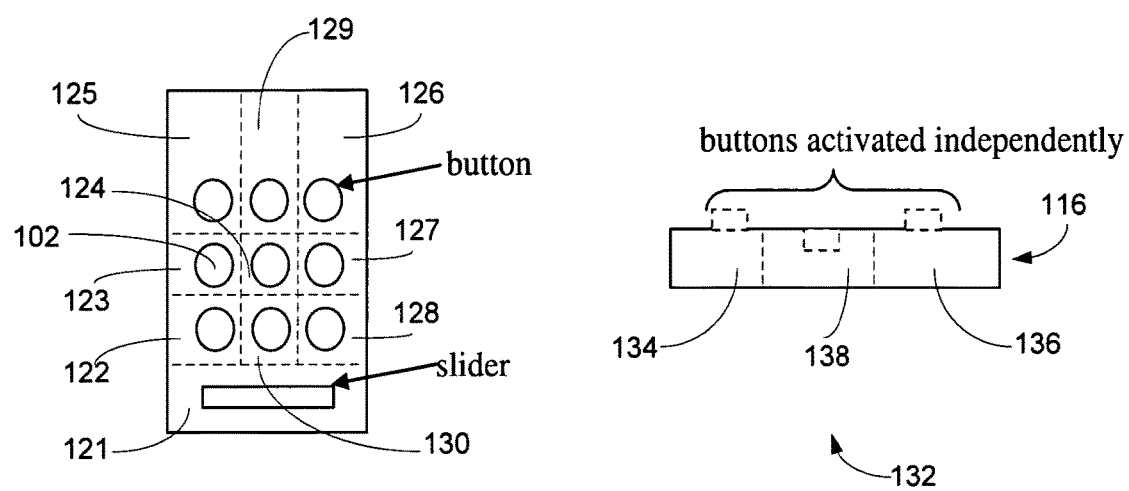
FIG. 1B is a block diagram illustrating multiple regions having programmable relief information functionalities in accordance with one embodiment of the present invention.

FIG. 1B is a block diagram 120 illustrating an interface device having multiple regions for providing relief information in accordance with one embodiment of the present invention. Diagram 120 illustrates a top view of an interface device 116, which includes ten (10) independent fixed cells or regions 121-130. It should be noted that each region could be a vibrating ping that vibrates to confirm the press of the finger on the surface. Each region can be independently programmed or controlled to provide relief information. Diagram 132 is a cross-section view of interface device 116, which illustrates a pattern of locating features that can be programmed. For example, Regions 134-136 are activated while region 138 is deactivated. Since each region can be selectively activated, interface device 116 is capable of changing its surface configurations for different applications. For example, interface device 116 may activate certain regions to configure the touch-sensitive surface as a key pad for a telephone. Alternatively, the touch surface may be configured as a key pad for a PDA. It should be noted that interface device 116 could have more than ten (10) independent controllable regions. For example, interface device 116 may include a 10×10 programmable grid, which may have 100 independent programmable regions.

Figure 1C:
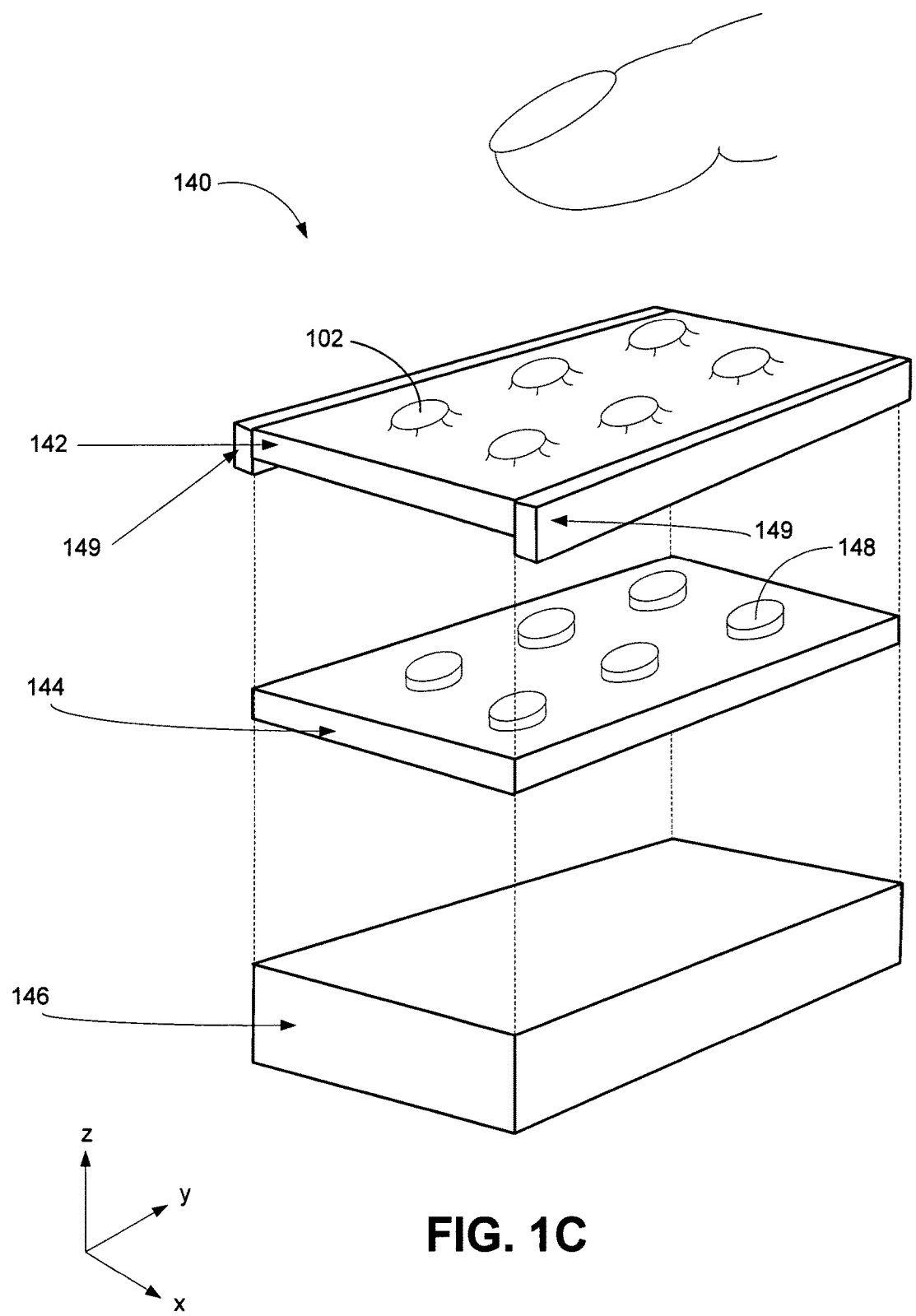
FIG. 1C is a three-dimensional ("3-D") block diagram illustrating an interface device having a deformable haptic surface capable of providing locating features in accordance with one embodiment of the present invention.

FIG. 1C is a three-dimensional (3-D) block diagram illustrating an interface device 140 having a deformable haptic surface capable of providing the locating features in accordance with one embodiment of the present invention. Interface device 140 includes a touch-sensitive surface 142, a haptic mechanism 144, and a display 146. Display 146 could be a liquid crystal display ("LCD") or a plasma flat panel display. Touch-sensitive surface 142 is capable of receiving inputs via contacting and/or touching on the surface. In one embodiment, touch-sensitive surface 142 includes a touch surface layer and a touch-sensitive screen layer. It should be noted that the underlying concept of the exemplary embodiment of the present invention would not change if one or more blocks (circuits or layers) were added to or removed from device 140.

Haptic mechanism 144, in one embodiment, includes multiple pins 148 and is made of rigid or solid materials such as alloy, metal, plastic, and the like. Touch-sensitive surface 142, on the other hand, is a relatively soft and flexible surface. Touch-sensitive surface 142 and haptic mechanism 144 are configured in such a way that they can move relative with each other. For instance, haptic mechanism 144 is configured to move along z-axis while touch-sensitive surface 142 is in a fixed position. When haptic mechanism 144 moves up against touch-sensitive surface 142, pins 148 on haptic mechanism 144 cause portions of touch-sensitive surface 142 to form bumps 102 due to the push from pin 148. As such, bumps 102 cause touch-sensitive surface 142 to be coarse or rough.

When haptic mechanism 144 is activated, the surface texture of touch-sensitive surface 142 displays a relief surface that is a series of user contactable bumps or buttons. On the other hand, when haptic mechanism 144 is not activated, the surface texture of touch-sensitive surface 142 becomes smooth. Alternatively, touch-sensitive surface 142 has a coarse texture when haptic mechanism 144 is not activated while touch-sensitive surface 142 has a smooth texture when haptic mechanism 144 is activated. Relief information emulating locating features such as bumps 102 can be generated in accordance with the haptic feedbacks. Alternatively, touch-sensitive surface 142 can be configured to be the moving layer while haptic mechanism 144 is a fixed layer. For example, when haptic mechanism 144 is activated, touch-sensitive surface 142 is configured to move along the z-axis relative to haptic mechanism 144. The surface texture of touch-sensitive surface 142 changes depending on the location of touch-sensitive surface 142 along the z-axis. In another embodiment, actuator(s) 149 in interface device 140 are used to generate haptic feedbacks or tactile feedbacks for input confirmation as well as haptic relief information.

Figure 1D:
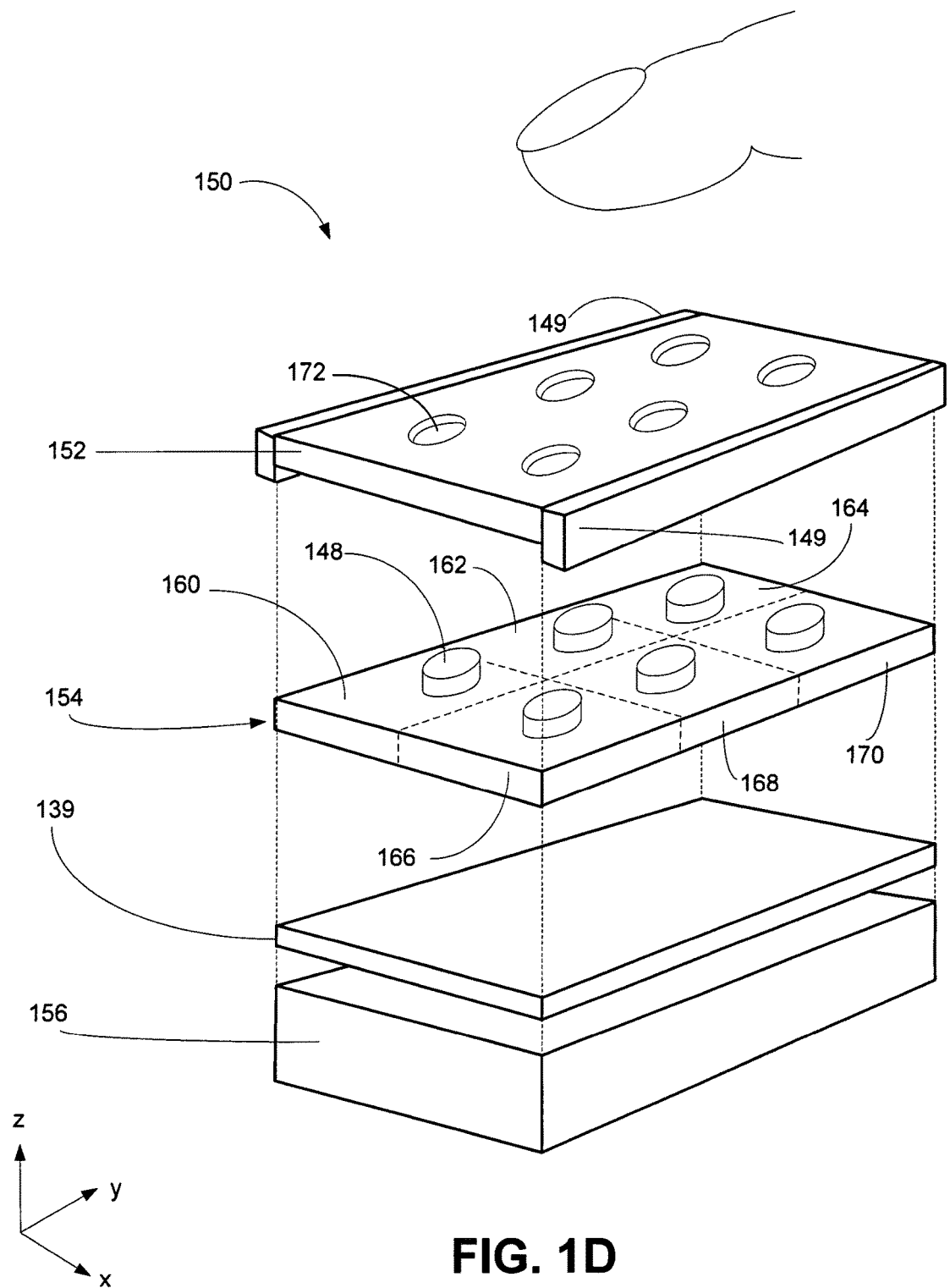
FIG. 1D is another example of 3-D block diagram illustrating an interface device having a deformable haptic surface with multiple independent regions in accordance with one embodiment of the present invention.

FIG. 1D is another example of 3-D block diagram illustrating an interface device 150 having a deformable haptic surface with multiple independent regions in accordance with one embodiment of the present invention. Interface device 150 includes a touch surface 152, a haptic mechanism 154, a touch screen 139, and a display 156, wherein display 156 could be a LCD or any other types of flat panel displays. Touch surface 152, in one embodiment, is a flexible layer for contacting and/or touching. Touch screen 139 or touch-sensitive layer is configured to sense an input(s) via contacting and/or touching on touch surface 152. For example, touch screen 139 may include various sensors such as capacitance sensors to detect user's contact by sensing the change of capacitance. It should be noted that the underlying concept of this embodiment of the present invention would not change if one or more layers were added to interface device 150.

Haptic mechanism 154, in one embodiment, includes multiple haptic controllable cells or regions 160-170 wherein each region supports a pin 148. Haptic mechanism 154 is made of rigid materials such as alloy, metal, plastic, and the like. Each region can be independently controlled and activated. Touch surface 152, on the other hand, is made of relatively flexible materials such as plastics and soft materials. Touch surface 152, in this embodiment, includes a set of predefined openings or holes 172, which allow pin or pins 148 to move through holes 172 extending portions of pins 148 above touch surface 152. When pins 148 reach above touch surface 152, button-like sensation with sharp edges on top of touch surface 152 are emulated when they are being felt.

Touch surface 152 and haptic mechanism 154 are configured in such a way that they can move relative with each other for controlling surface texture of touch surface 152. For instance, haptic mechanism 154 is configured to move in z-axis allowing pins 148 to move above or below touch surface 152 via holes 172 to control surface texture. For example, when the top surfaces of pins 148 level with touch surface 152, the surface texture of touch surface 152 should feel substantially smooth. Since each region can be independently controlled, different relief information may be generated for different input interfaces. It should be noted that different input interface has different configuration. For example, a phone input interface may require a different layout than a game input interface. It should be further noted that a thin flexible layer may be deposited over touch surface 152 to keep out the foreign objects such as dirt or liquid. The thin flexible layer may be an elastomeric (clear if a touch screen) layer, which is made of flexible materials such as nylon, urethane, acrylic, co-polymers, and the like.

FIG. 2A is a cross-section diagram 200 illustrating an interface device having a deformable haptic surface on a touch screen in accordance with one embodiment of the present invention. Diagram 200 includes a deformable touch-sensitive surface 202, a haptic mechanism 204, and a display 206. Display 206, in one embodiment, is an LCD or other flat panel display capable of displaying images viewable by the user. It should be noted that the underlying concept of the exemplary embodiment of the present invention would not change if one or more layers were added to diagram 200.

Haptic mechanism 204, in one embodiment, uses a (vertical) displacement technique to generate haptic feedbacks. Haptic feedback can also be referred to as tactile effect, tactile feedback, haptic effect, force feedback, or vibrotactile feedback. Haptic mechanism 204, having a predefined set of pins 210, is capable of moving between touch-sensitive surface 202 and display 206 vertically as indicated by arrows 209 as shown in FIG. 2A. When haptic mechanism 204 is activated, it moves in a direction relative to touch-sensitive surface 202 to change the surface texture using a set of pins 210. Since touch-sensitive surface 202 is made of deformable material while pins 210 are made of rigid material, portions of touch-sensitive surface 202 are being pushed up or deformed by pins 210 to form bumps 208. Bumps 208, in one embodiment, emulate edges of buttons on touch-sensitive surface 202 for relief information. It should be noted that haptic mechanism 204 can be configured to provide both relief information as well as input confirmation to the user(s) through a vibrotactile response.

Diagram 220 is a cross-section view of the interface device illustrating an alternative embodiment of interface device 210. The interface device includes touch-sensitive surface 202, haptic mechanism 204, and display 206. When haptic mechanism 204 is activated, a user's finger should feel a hole or opening sensation when the finger touches an indentation 222. In one embodiment, tips of pins 210 are attached to touch-sensitive layer 202 and when pins 210 pull away from touch-sensitive surface 202, they generate multiple indentations 222 on touch-sensitive layer 202. Alternative, pins 210 use various types of attractive forces or fields to create indentations 222 on the deformable surface of touch-sensitive surface 202.

FIG. 2B is a cross-section diagram 230 illustrating an interface device capable of providing the locating features using a set of openings on a touch screen in accordance with one embodiment of the present invention. Diagram 230 includes a touch surface 232, a haptic mechanism 204, a touch screen 239, and a display 236. Display 236 may be a flat panel display capable of displaying images viewable by the user. It should be noted that touch surface 232 and haptic mechanism 204 may be clear or substantially clear whereby the user can view the images displayed by display 236 through the layers of touch surface 232 and haptic mechanism 204. Touch screen 239 may include various capacitance sensors used for detecting user inputs by sensing the change of the capacitance. It should be noted that the underlying concept of the exemplary embodiment of the present invention would not change if one or more layers were added to device 230. In one embodiment, a thin elastomeric layer, not shown in FIG. 2A and FIG. 2B, is deposited over touch-sensitive surface 202 or touch surface 232 to keep out the foreign objects such as dirt or liquid. It should be noted that the elastomeric layer can be clear and may be made of flexible materials such as nylon, urethane, acrylic, co-polymers, and the like.

Haptic mechanism 204, in one embodiment, uses a displacement (vertical) technique to generate haptic feedbacks. Haptic mechanism 204, having a predefined set of pins 210, is capable of moving between touch surface 232 and touch screen 239 vertically as indicated by arrows 209 as shown in FIG. 2B. When haptic mechanism 204 is activated, it moves in a direction relative to touch surface 232 to change the surface texture using pins 210. Touch surface 232, in this embodiment, includes a set of predefined openings or holes 234, which provide a set of conduits allowing pins 210 to extend above touch-sensitive surface 232. When pins 210 reach above touch surface 232, button-like sensation on the top of touch-surface 232 is emulated. On the other hand, when the top surfaces of pins 210 level with touch surface 232, the surface texture of touch surface 232 should feel smooth or substantially smooth. It should be noted that haptic mechanism 204 can be configured to provide both relief information as well as input confirmation to the user(s).

Diagram 240 is another cross-section view of interface device illustrating an alternative embodiment of interface device illustrated in diagram 230. Diagram 240 includes touch surface 232, haptic mechanism 204, touch screen 239, and display 236. When haptic mechanism 204 is activated, a user's finger should feel hole or opening sensation when the finger touches indentations 238. By manipulating haptic mechanism 204 relative to touch surface 232, the relief information is created. It should also be noted that vibration of pins 210 just below the surface can still be felt for confirmation.

FIG. 2C is a cross-section diagram 250 illustrating an interface device employing a lateral displacement haptic mechanism to provide the locating features in accordance with one embodiment of the present invention. Diagram 250 includes a touch-sensitive surface 252, a haptic mechanism 254, and a lever 256. Lever 256 is a rigid bar wherein one end of the bar is pivoted on a fixed point at touch-sensitive surface 252 and/or another end of the bar is pivoted on another fixed point at haptic mechanism 254. Other layers may be added to diagram 250, but they are not important to understand the present embodiment of the present invention.

In operation, when haptic mechanism 254 shifts laterally relative to touch-sensitive surface 252, lever 256 changes its position, which is substantially perpendicular to touch-sensitive surface 252. The new position generates one or more bumps 262 as illustrated in diagram 260. As such, a coarse surface is formed when lever 256 is in one position while a smooth surface is formed when lever 256 is in another position as illustrated FIG. 2C.

FIG. 2D is a cross-section diagram 270 illustrating a deformable haptic surface employing a push and pull haptic mechanism in accordance with one embodiment of the present invention. Diagram 270 includes a touch-sensitive surface 272 and a haptic mechanism 274. When touch-sensitive surface 272 is being pushed at both ends as indicated by arrows 279, touch-sensitive surface 272 creates various bumps 282 by buckling its surface as illustrated in diagram 280. Alternatively, if one side of touch-sensitive surface 272 is fixed and the other side of touch-sensitive surface 272 is being pushed, touch-sensitive surface 272 also buckles to create various bumps 282. It should be noted that touch-sensitive surface 272 may be replaced with a touch surface and a touch screen.

Haptic mechanisms as described above can be used by an interface device having multiple haptic cells or regions. A combination of different haptic mechanisms may also be used in one interface device to achieve the best haptic results. The following embodiments illustrated by FIG. 3 through FIG. 8 are additional examples of haptic devices that can be used to generate haptic feedback for controlling surface texture as well as input confirmation.

Figures 3A, 3B:
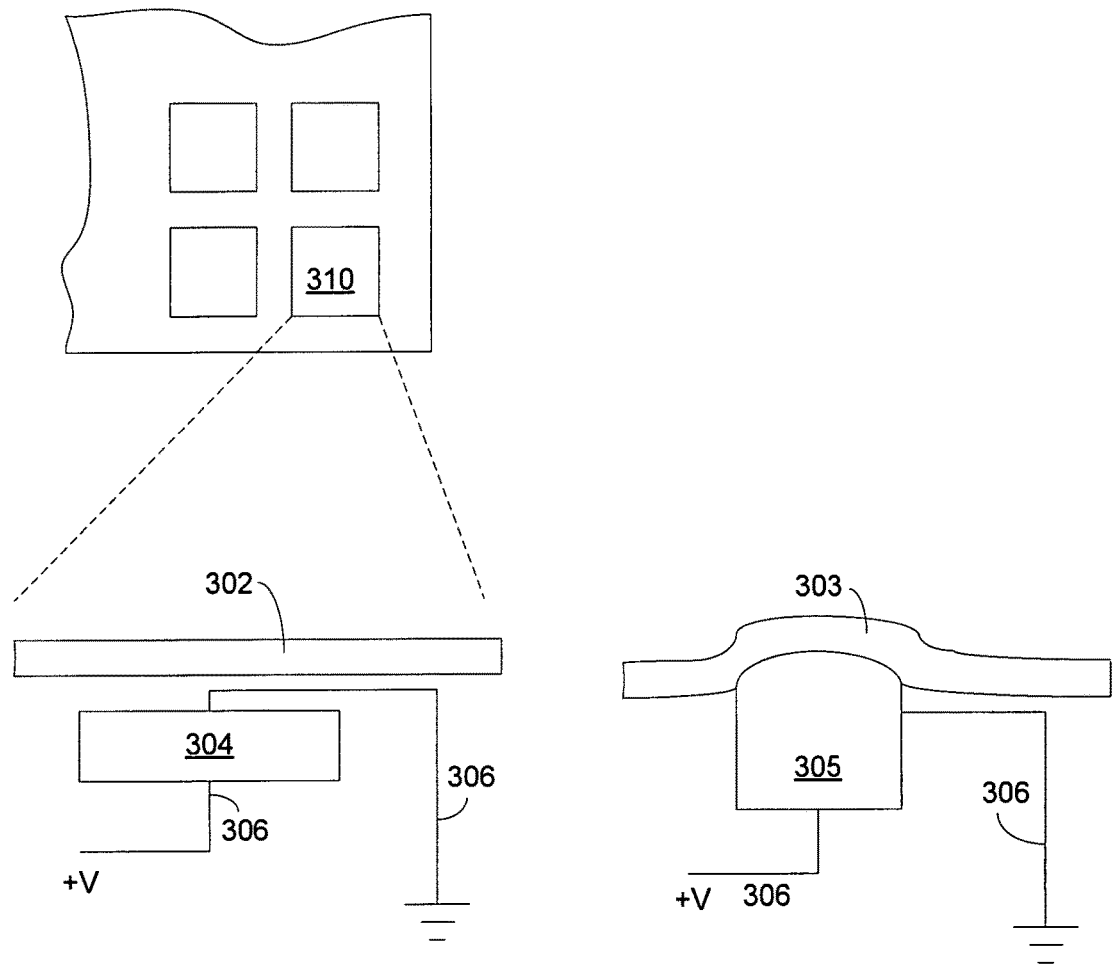
FIG. 3(a-b) illustrates a haptic cell in an interface device using piezoelectric materials to generate haptic effects in accordance with one embodiment of the present invention.

FIG. 3(a) illustrates a haptic region 310 using piezoelectric materials to generate haptic effects in accordance with one embodiment of the present invention. Region 310 includes an electrical insulated layer 302, a piezoelectric material 304, and wires 306. Electrical insulated layer 302 has a top surface and a bottom surface, wherein the top surface is configured to receive inputs. A grid or an array of piezoelectric materials 304 in one embodiment is constructed to form a piezoelectric or haptic layer, which also has a top and a bottom surface. The top surface of the piezoelectric layer is situated adjacent to the bottom surface of electrical insulated layer 302. Each region 310 includes at least one piezoelectric material 304 wherein piezoelectric material 304 is used to generate haptic effects independent of other piezoelectric region 310 in piezoelectric layer. In one embodiment, multiple adjacent or neighboring regions 310 are capable of generating multiple haptic effects in response to multiple substantially simultaneous touches. In another embodiment, each of regions 310 has a unique piezoelectric material thereby it is capable of initiating a unique haptic sensation.

It should be noted that a tactile touch panel, which includes an electrical insulated layer 302 and a piezoelectric layer, in some embodiments further includes a display, not shown in the figure. This display may be coupled to the bottom surface of the piezoelectric layer and is capable of projecting images that are viewable from the top surface of electrical insulated layer 302. It should be noted that the display can be a flat panel display or a flexible display. Piezoelectric materials 304, in one embodiment, are substantially transparent and small. The shape of piezoelectric material 304, for example, deforms in response to electrical potentials applied via electrical wires 306.

During a manufacturing process, a piezoelectric film is printed to include an array or a grid of piezoelectric regions 310. In one embodiment, a film of regions 310 containing piezoelectric materials is printed on a sheet in a cell grid arrangement. The film further includes wirings for directly addressing every region 310 in the device using electrical control signals. Region 310, for example, can be stimulated using edge or back mounted electronics. Piezoelectric materials may include crystals and/or ceramics such as quartz ($Sio_2$)

FIG. 3(b) illustrates a haptic cell 310 generating haptic effects in accordance with an embodiment of the present invention. During operation, when a voltage potential applies to piezoelectric material 305 via wires 306, piezoelectric material 305 deforms from its original shape of piezoelectric material 304, as shown in FIG. 3(a), to expanded shape of piezoelectric material 305. Deformation of piezoelectric material 305 causes electrical insulated layer 303 to deform or strain from its original state of layer 302, as shown in FIG. 3(a). In an alternative embodiment, piezoelectric materials 305 return to its original state as soon as the voltage potential is removed. It should be noted that the underlying concept of the present invention does not change if additional blocks (circuits or mechanical devices) are added to the device illustrated in FIG. 3(a-b). If the piezoelectric material is replaced with other materials such as shape memory alloys ("SMAs"), such material may be capable of maintaining its deformed shape for a period of time after the voltage potential is removed. It should be noted that the underlying concept of the embodiments of the present invention does not change if different materials other than piezoelectric actuators are employed. As such a grid of piezoelectric actuators may be used to control the surface texture of touch-sensitive surface of the interface device.

FIG. 4(a) is a diagram 400 illustrating another embodiment of a haptic cell 310 using Micro-Electro-Mechanical Systems ("MEMS") device 402 to generate haptic effects in accordance with one embodiment of the present invention. Diagram 400 depicts a block 410, which shows a top view of cell 310. Cell 310 includes a MEMS device 402. In one embodiment, MEMS device 402 is substantially transparent thereby the image projection from a display, not shown in FIG. 4(a), can be viewed through block 410. It should be noted that each of haptic cells 310 is coupled to at least one wire to facilitate and generate haptic effects.

MEMS can be considered as an integration of mechanical devices, sensors, and electronics on a silicon or organic semiconductor substrate, which can be manufactured through conventional microfabrication process. For example, the electronic devices may be manufactured using semiconductor fabrication process and micromechanical devices may be fabricated using compatible microfabrication process. In one embodiment, a grid or an array of MEMS devices 402 are made of multiple cantilever-springs. A grid of cantilever-springs can be etched using MEMS manufacturing techniques. Also, electrical wirings for stimulating or driving cantilever-springs can also be directly etched onto the surface of the MEMS device 402 thereby every single MEMS device can be correctly addressed. MEMS cantilevers can be stimulated using a resonant drive (for vibrotactile) or direct actuation (kinesthetic).

FIG. 4(b) illustrates a side view of MEMS device 402, wherein MEMS device 412 can be stimulated or deformed from its original state of MEMS device 402 to deformed state of MEMS device 414 when a voltage potential across MEMS device is applied. Displacement 404 between the original state and the deformed state depends on the composition of materials used and the size of MEMS device 402. Although smaller MEMS devices 402 are easier to fabricate, they offer smaller displacement 404. In one embodiment, cantilever-springs can be made of piezo materials. It should be noted that the actuation of piezo material is generally vibrotactile sensation. It should be further noted that piezo material can be used as a sensor for sensing fingertip positions and depressions.

MEMS device 402, in another embodiment, uses shape memory alloy ("SMA") in place of cantilever-spring as mentioned above. The actuation generated by MEMS device 402 using SMA provides kinesthetic actuation. SMA, also known as memory metal, could be made of copper-zinc-aluminum, copper-aluminum-nickel, nickel-titanium alloys, or a combination of copper-zinc-aluminum, copper-aluminum-nickel, and/or nickel-titanium alloys. Upon deforming from SMA's original shape, SMA regains its original shape in accordance with an ambient temperature and/or surrounding environment. It should be noted that the present invention may combine piezoelectric elements, cantilever-spring, and/or SMA to achieve a specific haptic sensation. As such, a grid of MEMS device 402 may be used to control the surface texture of touch-sensitive surface of the interface device.

Figure 5A:
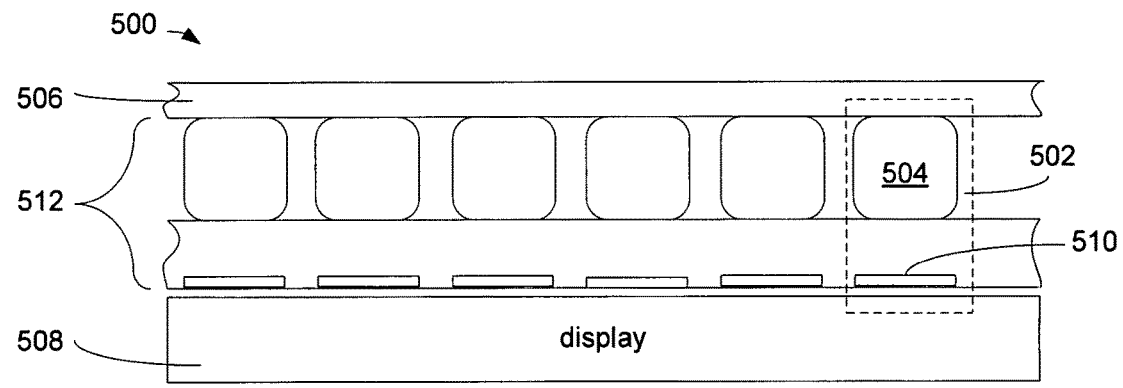
FIG. 5(a-b) illustrates a side view of an interface device having an array of haptic cells with thermal fluid pockets in accordance with one embodiment of the present invention.

FIG. 5(a) is a side view diagram of an interface device 500 illustrating an array of haptic cells 502 with thermal fluid pockets 504 in accordance with one embodiment of the present invention. Device 500 includes an insulated layer 506, a haptic layer 512, and a display 508. While the top surface of insulated layer 506 is capable of receiving inputs from a user, the bottom surface of insulated layer 506 is placed adjacent to the top surface of haptic layer 512. The bottom surface of haptic layer 512 is placed adjacent to display 508, wherein haptic layer 512 and insulated layer 506 may be substantially transparent thereby objects or images displayed in display 508 can be seen through haptic layer 512 and insulated layer 506. It should be noted that display 508 is not a necessary component in order for the interface device to function.

Haptic layer 512, in one embodiment, includes a grid of fluid filled cells 502, which further includes at least one thermal fluid pocket 504 and an associated activating cell 510. It should be noted that each of fluid filled cells 502 can include multiple thermal fluid pockets 504 and associated activating cells 510. In another embodiment, a fluid filled cell 502 includes multiple associated or shared activating cells 510 thereby initiating a different activating cell generates a different haptic sensation(s).

Activating cell 510, in one embodiment, is a heater, which is capable of heating an associated thermal fluid pocket 504. Various electrical, optical, and mechanical techniques relating to heating technology can be used to fabricate activating cells 510. For example, various electrically controlled resistors can be used for activating cells 510, wherein resistors can be implanted in haptic layer 512 during the fabrication. Alternatively, optical stimulators such as infrared lasers can be used as activating cells 510 to heat up thermal fluid pockets 504. Optical stimulator, for example, can be mounted at the edge of the interface device. It should be noted that activating cells 510 can be any types of optical or radioactive stimulator as long as it can perform the function of a heating device. Activating cells 510 may also use rear mounted thermal stimulators, which are similar technologies like hot plasma displays such as are commonly found in flat panel plasma televisions.

Device 500 further includes a set of control wires, not shown in FIG. 5(a), wherein each of activating cells 510 is coupled to at least one pair of wires. The wires are configured to transmit activating/deactivating control signals, which are used to drive activating cells 510. It should be noted that each of fluid filled cells 502 is addressable using signals from wires or wireless networks. Display 508, in one aspect, can be a flat panel display or a flexible display. In an alternative embodiment, the physical location of display 508 is exchangeable with haptic layer 512. Also, thermal fluid pockets 504, in one embodiment, can be activated by a piezoelectric grid.

Thermal fluid pockets 504, in one embodiment, include fluid with physical properties of low specific heat and high thermal expansion. Examples of this fluid include glycerin, ethyl alcohol, or the like. Thermal fluid pockets 504 are capable of producing multiple localized strains in response to multiple touches received by insulated layer 506. Each localized strain is created by a heated thermal fluid pocket 504 wherein the heat is generated by an associated activating cell 510. In one embodiment, a thermal fluid pocket 504 changes its physical shape in accordance with the temperature of the fluid in the pocket. In another embodiment, fluid filled cell 502 has an active cooling system, which is used to restore the expanded shape of thermal fluid pocket 504 to its original shape after it is deactivated. The control of fluid temperature affects haptic bandwidth. Rapid rising of fluid temperature and fast heat dissipation of fluid enhance haptic bandwidth of thermal fluid packets.

The physical size of each fluid cell 502 can also affect the performance of the cell for generating haptic sensation(s). For example, if the size of fluid cell 504 is smaller than ½ fingertip, the performance of cell 504 enhances because smaller cell permits rapid heat dissipation as well as quick temperature rising of fluid in the cell. In another embodiment, thermal plastic pockets filled with plastic fluid are used in place of thermal fluid pockets 504 filled with thermally sensitive fluid to enhance the haptic effects. Using thermal plastic pockets filled with plastic-like fluid can produce high thermal plastic strain. For example, a type of plastic fluid is polyethylene. Thermal plastic pockets can also provide different and unique haptic sensations to the user. In another embodiment, some exotic fluids such as electrorheological and/or magnetorheological fluid can be used in place of thermal fluid in thermal fluid pockets 504. Thermal fluid pockets 504 filled with electrorheological fluid can be stimulated by a local or remote electrical field, while thermal fluid pockets 504 filled with magnetorheological fluid can be stimulated by a local or remote magnetic field.

Figure 5B:
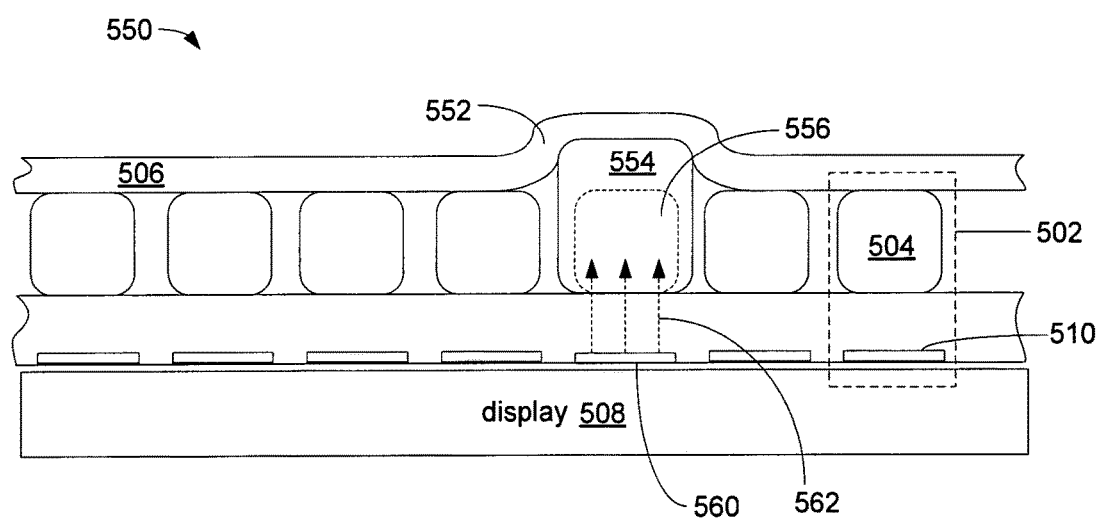

FIG. 5(b) is a side view diagram for an interface device 550 illustrating an array of haptic cells 502 using thermal fluid pockets 554 in accordance with one embodiment of the present invention. Device 550 also shows an activated thermal fluid pocket 554 and an activated activating cell 560. During the operation, thermal fluid pocket 554 increases its physical volume (or size) from its original state 556 to expanded thermal fluid pocket 554 when activating cell 560 is activated. When activating cell 560 is activated, it provides heat 562 to thermal fluid pocket 554 or 556 to expand the size of thermal fluid pocket 554 or 556. Due to the expansion of thermal fluid pocket 554, a localized portion 552 of insulated layer 506 is created. As soon as the temperature of the fluid in the thermal fluid pocket 554 cools down, the size of thermal fluid pocket 554 returns to its original state 556. The change of size between original size of a thermal fluid pocket 556 and expanded size of thermal fluid pocket 554 generates a haptic effect. It should be noted that activating cell 560 could be an electric heater or an optical heater such as an infrared simulator. As such, an array of haptic cells using thermal fluid pockets 552 may be used to control the surface texture of touch-sensitive surface of the interface device.

FIG. 6(a) is a side view diagram of an interface device 600 illustrating an array of MEMS pumps 602 in accordance with one embodiment of the present invention. Diagram 600 includes an insulated layer 606 and a haptic layer 612. While the top surface of insulated layer 606 is configured to receive a touch or touches from a user, the bottom surface of insulated layer 606 is placed adjacent to the top surface of haptic layer 612. The bottom surface of haptic layer 612 is, in one embodiment, placed adjacent to a display (not shown in FIG. 6(a)), wherein haptic layer 612 and insulated layer 606 may be substantially transparent thereby objects or images displayed in the display can be seen through haptic layer 612 and insulated layer 606. It should be noted that display is not a necessary component in order for the interface device to function.

Haptic layer 612, in one embodiment, includes a grid of MEMS pumps 602, which further includes at least one pocket 604. Each MEMS pump 602 includes a pressurized valve 608 and a depressurized valve 610. Pressurized valve 608 is coupled to an inlet tube 614 while depressurized valve 610 is coupled to an outlet tube 616. In one embodiment, inlet tube 614, which is under high liquid pressure, is used to pump liquid through pressurized valve 608 to expand pocket 604. Similarly, outlet tube 616, which is under low pressure, is used to release the liquid through depressurized valve 610 to release the pressure from pocket 604. It should be noted that MEMS pumps 602 can be coupled to the same pressurized liquid reservoir. It should be further noted that pressurized valve 608 and depressurized valve 610 can be combined into one single valve for both inlet tube 614 and outlet tube 616. It should be further noted that inlet tube 614 and outlet tube 616 can also be combined into one tube.

A grid of MEMS pumps 602 includes an array of pressurized valves 608 and depressurized valves 610, wherein pressurized valves 608 are coupled with a rear or a side mounted liquid reservoir under pressure while depressurized valves 610 are coupled to a rear or a side mounted depressurized liquid reservoir with low pressure. Valves 608-610 control the filling and emptying the liquid pockets 604 in MEMS pumps 602 to produce localized strain. An advantage of using pressurized liquid reservoir is to quickly deform the surface of insulated layer 606 and to maintain the deformation with minimal or no energy consumption (or expenditure). It should be noted that MEMS pump 602 can also use pressurized air or other gases to achieve similar results as liquid.

Device 600 further includes a set of control wires 617-618, which can be used to control pressurized valve 608 and depressurized valve 610, respectively. It should be noted that each valve in haptic layer 612 is addressable using electrical signals transmitted from wires or wireless network.

Figure 6:
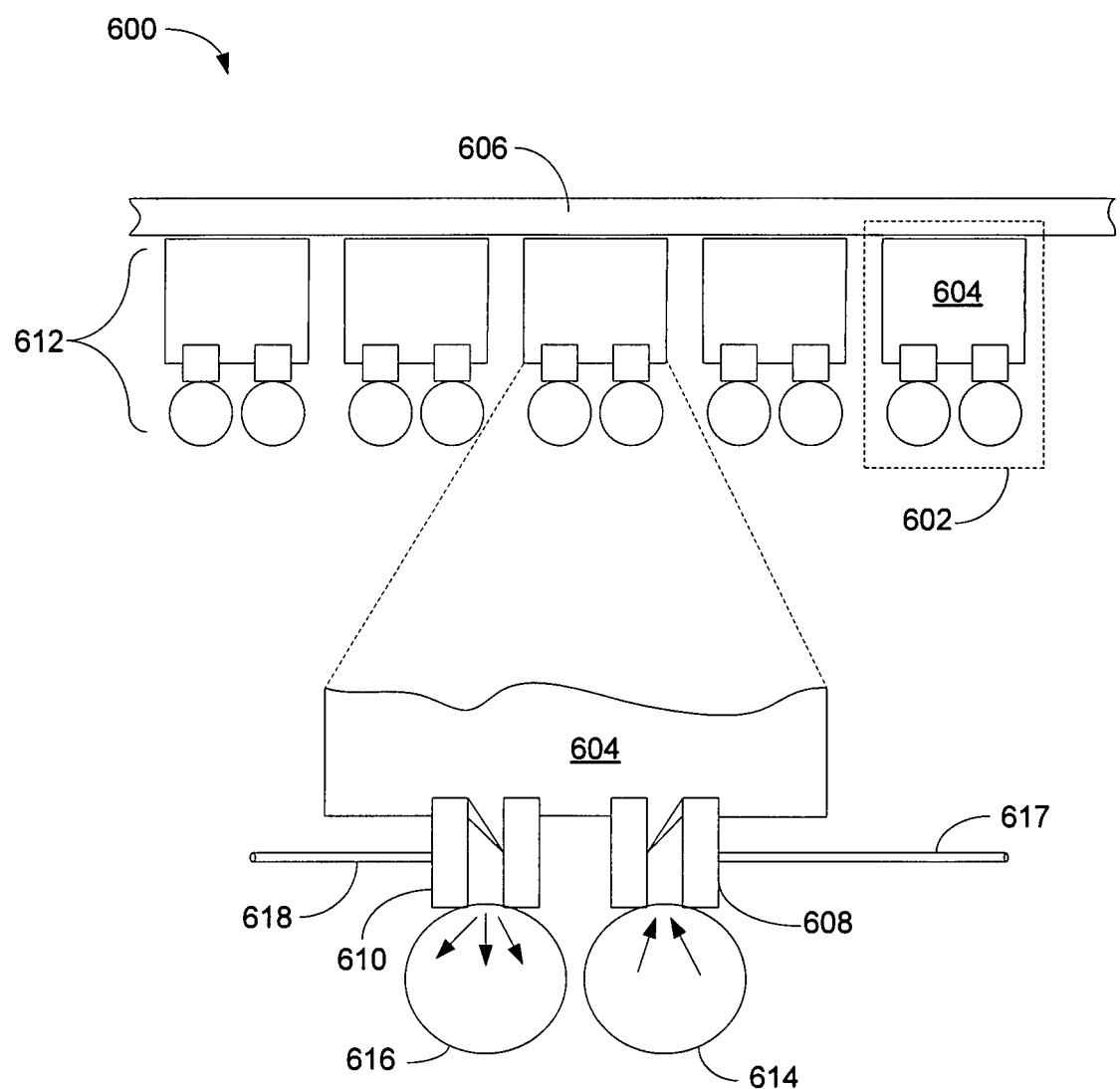
FIG. 6(a-b) illustrates a haptic cell employing Micro-Electro-Mechanical Systems pumps to generate haptic effects in accordance with one embodiment of the present invention.
Figure 6B:
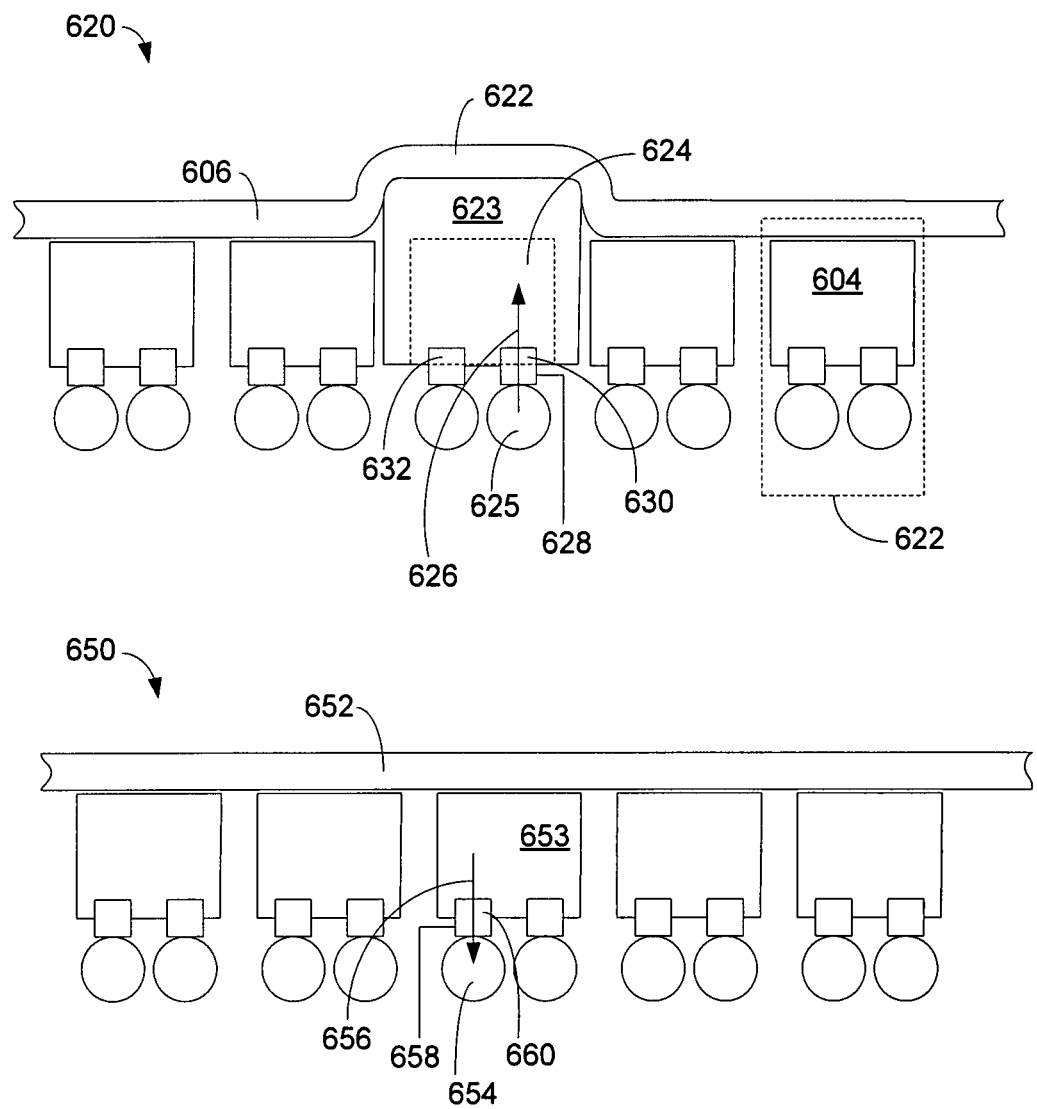

FIG. 6(*b*) illustrates two diagrams of an interface device 620 and 650 having an array of MEMS pumps 604 in accordance with one embodiment of the present invention. Device 620 illustrates an activated pocket 623, which includes an activated inlet valve 630 and a deactivated outlet valve 632. During an operation, pocket 623 increases its physical volume (or size) from its original state 624 to its expanded pocket 623 when inlet valve 630 is activated. When inlet valve 630 is activated (or open) in response to electrical signal from wire 628, inlet tube 625 pumps liquid 626 from pressurized reservoir to pocket 623. Due to the expansion of pocket 623, a localized strain 622 of insulated layer 606 is created.

Device 650 illustrates an activated MEMS pump returns from its expanded state of pocket 623 to the original state of pocket 653. When depressurized valve 660 is activated, depressurized valve 660 releases liquid 656 from pocket 653 to low pressurized outlet 654. It should be noted that depressurized valve 660 is controlled by at least one control signal via wire 658. The changing in volume between original size of pocket 604 and expanded size of pocket 623 generates haptic effects. As such, an array of MEMS pumps 602 may be used to control the surface texture of touch-sensitive surface of the interface device.

Figure 7:
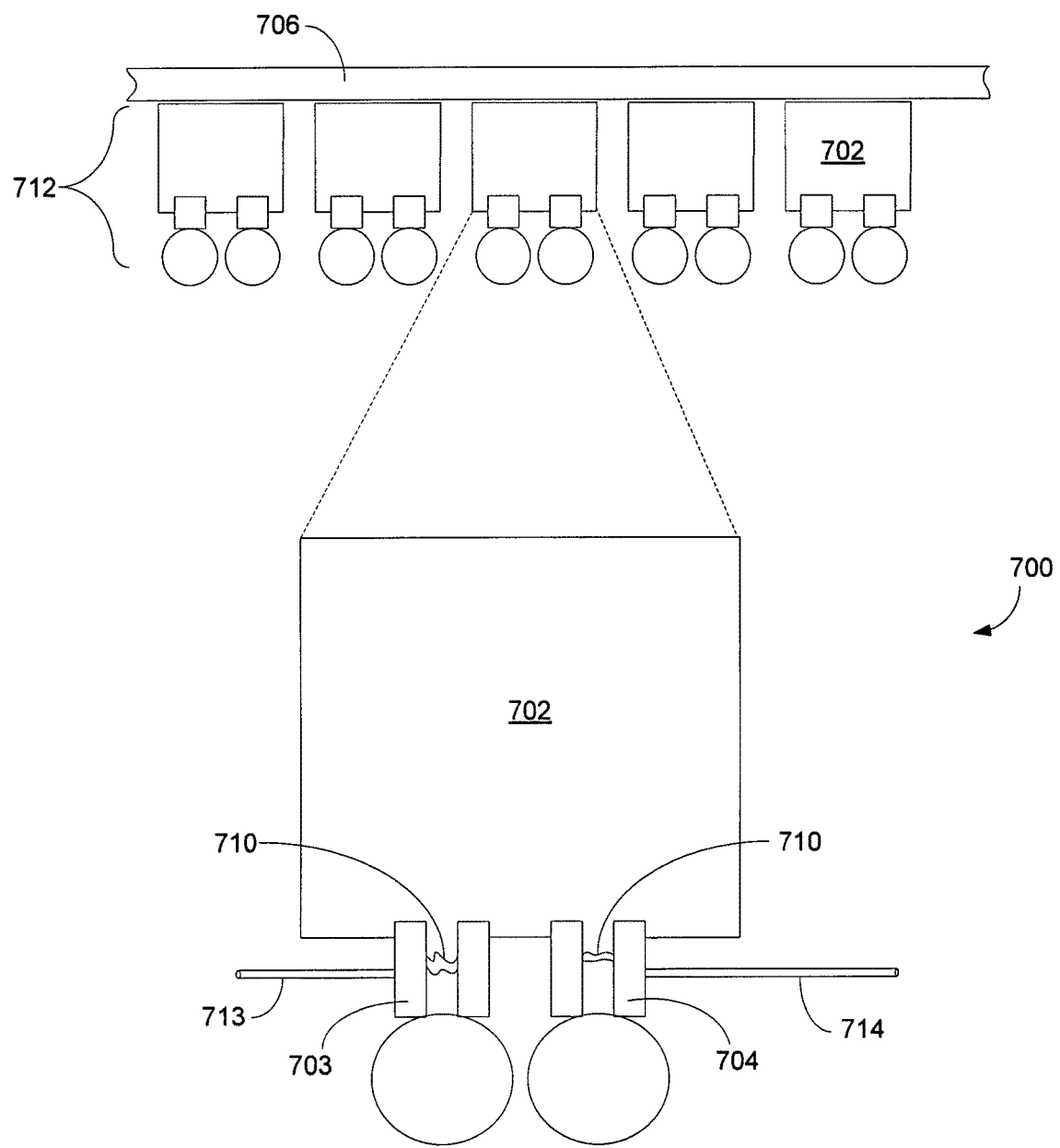
FIG. 7 illustrates a side view diagram for an interface device having an array of haptic cells using variable porosity membrane in accordance with one embodiment of the present invention.

FIG. 7 illustrates a side view diagram for an interface device 700 having an array of haptic cells 702 using variable porosity membrane 710 in accordance with one embodiment of the present invention. Device 700 includes an insulated layer 706 and a haptic layer 712. While the top surface of insulated layer 706 is configured to receive inputs from a user, the bottom surface of insulated layer 706 is placed adjacent to the top surface of haptic layer 712. The bottom surface of haptic layer 712 is, in one embodiment, placed adjacent to a display (not shown in FIG. 7), wherein haptic layer 712 and insulated layer 706 may be substantially transparent thereby objects or images displayed in the display can be seen through haptic layer 712 and insulated layer 706. It should be noted that display is not a necessary component in order for the interface device to function.

Haptic layer 712, in one embodiment, includes a grid of haptic cells 702, inlet valves 703, and outlet valves 704. Haptic cells 702, in one embodiment, are pockets capable of containing fluid. Haptic layer 712 is similar to haptic layer 612 as shown in FIG. 6(*a*) except that haptic layer 712 employs porosity membranes. While each inlet valve 703 is controlled by control signal(s) transmitted by wire 713, each outlet valve 704 is controlled by electrical signals transmitted over a wire 714. Every inlet valve 703 or outlet valve 704 employs at least one porosity membrane 710. Porosity membranes 710 are coupled (or face) to a liquid reservoir wherein each membrane 710 is configured to control how much liquid should enter and/or pass through membrane 710. An advantage of using porosity membranes is to maintain the deformation of insulated layer 706 with minimal or no energy consumption. As such, a grid of haptic cells using variable porosity membrane 710 may be used to control the surface texture of touch-sensitive surface of the interface device.

Figure 8:
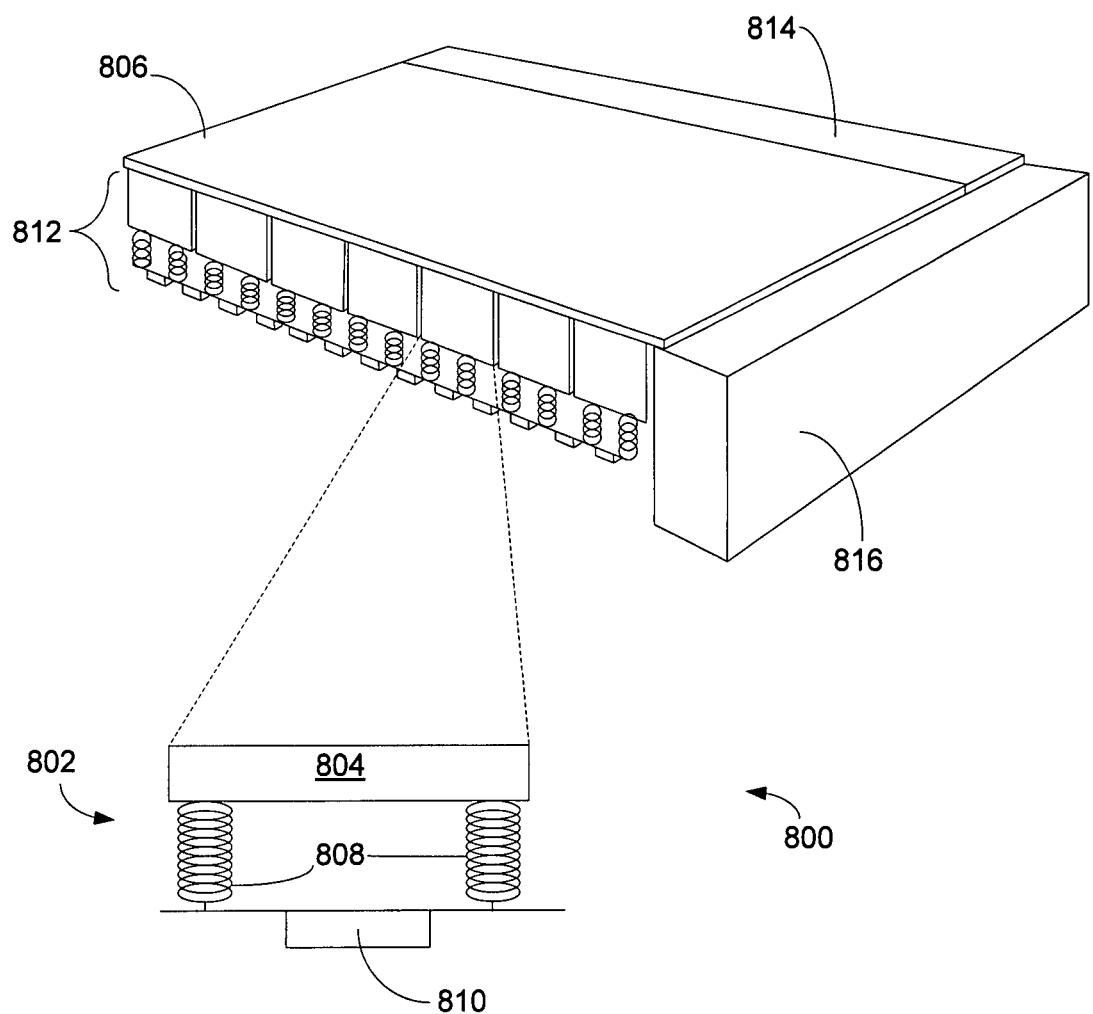
FIG. 8 is a side view of an interface device having an array of haptic cells using various resonant devices in accordance with one embodiment of the present invention.

FIG. 8 is a side view of an interface device 800 having an array of haptic cells 802 using various resonant devices in accordance with one embodiment of the present invention. Device 800 includes an insulated layer 806 and a haptic layer 812. While the top surface of insulated layer 806 is configured to receive an input from a user, the bottom surface of insulated layer 806 is placed adjacent to the top surface of haptic layer 812. The bottom surface of haptic layer 812 is, in one embodiment, placed adjacent to a display (not shown in FIG. 8), wherein haptic layer 812 and insulated layer 806 may be substantially transparent thereby objects or images displayed in the display can be seen through haptic layer 812 and insulated layer 806. It should be noted that insulated layer 806 may be flexible whereby it is capable of providing desirable relief information on its surface.

Haptic layer 812, in one embodiment, includes a grid of haptic cells 802, wherein each cell 802 further includes a permanent magnet 804, an electro magnet 810, and two springs 808. Haptic layer 812 is similar to haptic layer 612 shown in FIG. 6(*a*) except that haptic layer 812 employs resonant devices while haptic layer 612 uses MEMS pumps. Haptic cell 802, in one embodiment, uses a resonant mechanical retractable device to generate haptic effects. The resonant mechanical retractable device vibrates in response to a unique frequency, which could be generated by a side mounted resonant stimulator 816 or a rear mounted resonant stimulator 814. A resonant grid, in one embodiment, is used to form a haptic layer 812. Each cell 802 is constructed using resonant mechanical elements such as Linear Resonant Actuator ("LRA") or MEMS springs. Each cell 802, however, is configured to have a slightly different resonant frequency and a high Q (high amplification at resonance and a narrow resonant frequency band). As such, each cell 802 can be stimulated using mechanical pressure waves originating at the edges of the sheet. The haptic effects can also be generated by a piezoelectric or other high bandwidth actuator.

Cell 802, in another embodiment, includes one spring 808. In yet another embodiment, cell 802 includes more than two springs 808. Each spring 808 is configured to respond to a specific range of frequencies thereby each spring 808 can produce a unique haptic sensation. As such, a grid of haptic cells using various resonant devices may be used to control the surface texture of touch-sensitive surface of the interface device. For example, if the displacement of haptic mechanism is sufficiently high such as 200 micrometers or greater, the movement (or tactile vibration) with low frequencies such as 50 Hz or less should sufficiently create desirable relief information.

The exemplary embodiment(s) of the present invention includes various processing steps which will be described below. The steps of the embodiments may be embodied in machine or computer executable instructions. The instructions can be used to cause a general purpose or special purpose system, which is programmed with the instructions, to perform the steps of the present invention. Alternatively, the steps of the present invention may be performed by specific hardware components that contain hard-wired logic for performing the steps, or by any combination of programmed computer components and custom hardware components. While embodiments of the present invention will be described with reference to the Internet, the method and apparatus described herein is equally applicable to other network infrastructures or other data communications environments.

Figure 9:
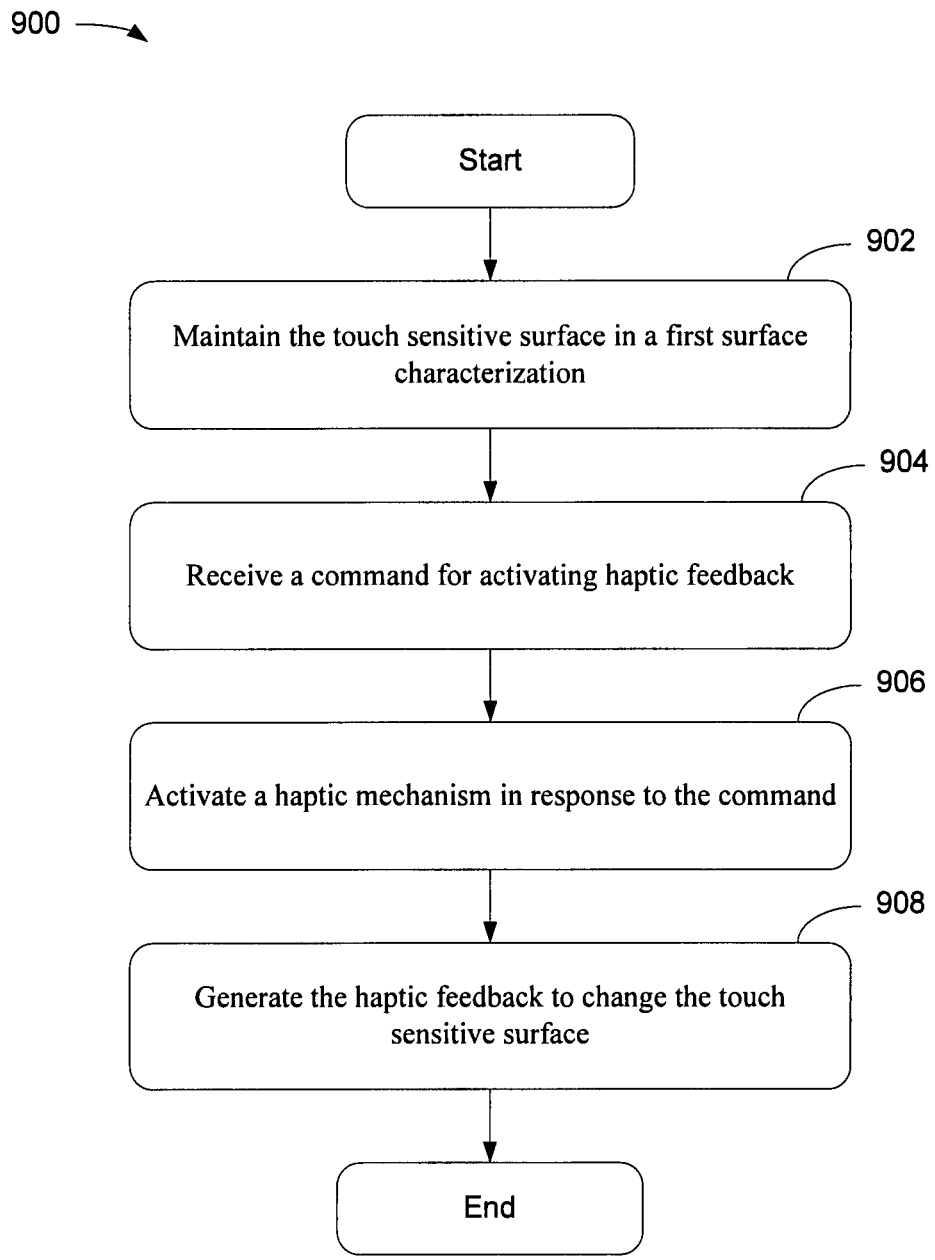
FIG. 9 is a flowchart illustrating a process of providing locating features on a deformable haptic surface in accordance with one embodiment of the present invention.

FIG. 9 is a flowchart illustrating a process 500 of providing locating features on a deformable haptic surface in accordance with one embodiment of the present invention. At block 902, the process maintains the touch-sensitive surface in a first surface characterization. The first surface characterization, for example, is a rough surface texture. In one embodiment, the process maintains a coarse textured surface. The coarse textured surface has a rough surface including bumps or sharp edges emulating edges of a button. After block 902, the process moves to block 904.

At block 904, the process receives a command for activating haptic feedback. For example, the process receives a command initiated by a user. Alternatively, the process receives a command issued by a logic processing device. After block 904, the process proceeds to the next block.

At block 906, the process activates a haptic mechanism in response to the command. The process, in one embodiment, creates bump or button sensation on the surface of the touch-sensitive surface. For example, the process activates the haptic mechanism by allowing various pins on the haptic mechanism to reach above or below the touch-sensitive surface to create bump or button sensation. In one embodiment, the process facilitates or controls the pins in a predefined conduit to control the texture of the surface. Alternatively, the process shifts the haptic mechanism laterally with respect to the touch-sensitive surface to form bump or hole sensation on the touch surface. Also, the process pushes the touch-sensitive surface to control surface texture by buckling the touch surface. Once the haptic mechanism is deactivated, the touch surface or touch-sensitive surface returns to its surface original texture format. After block 906, the process moves to the next block.

At block 908, the process generates haptic feedback to change surface texture of the touch-sensitive surface from a first surface characterization to a second surface characterization. In one embodiment, the process also senses a contact or a touch on the touch-sensitive surface and subsequently, generates an input signal in response to the contact. In another embodiment, the process further generates confirmation tactile feedback to confirm the sensed contact or touch on the touch-sensitive surface. After block 908, the process ends.

While particular embodiments of the present invention have been shown and described, it will be obvious to those skilled in the art that, based upon the teachings herein, changes and modifications may be made without departing from this invention and its broader aspects. Therefore, the appended claims are intended to encompass within their scope of all such changes and modifications as are within the true spirit and scope of the exemplary embodiment(s) of the present invention.

What is claimed is:

1. An interface device comprising:
a haptic mechanism operable to provide haptic feedback in response to an activating command;
a touch-sensitive surface coupled to the haptic mechanism and capable of changing its surface relief from a first surface characteristic to a second surface characteristic in response to the activating command; and
a display operable to display viewable images through the touch-sensitive surface and the haptic mechanism,
wherein the haptic mechanism is operable to provide a first tactile feedback and a second tactile feedback, wherein the first tactile feedback causes the touch-sensitive surface to change from the first surface characteristic to the second surface characteristic, and wherein the second tactile feedback provides haptic acknowledgement to a user confirming a user input selection, wherein the haptic mechanism is a rigid layer having at least one surface feature that includes a plurality of pins positioned above the display and below the touch-sensitive surface, wherein the haptic mechanism is operable to move relative to the touch-sensitive surface to provide the first tactile feedback, and wherein moving the haptic mechanism moves a pin of the plurality of pins above the touch-sensitive surface or below the touch-sensitive surface through a hole of a plurality of holes in the touch-sensitive surface.

2. The device of claim 1, wherein the haptic mechanism includes a lateral displacement mechanism, wherein the lateral displacement mechanism is capable of changing the surface relief of the touch-sensitive surface by moving the touch-sensitive surface laterally against the haptic mechanism.

3. The device of claim 1, wherein the haptic mechanism includes a plurality of air pockets, wherein the plurality of air pockets is capable of altering the surface relief of the touch-sensitive surface by filling and releasing air in the plurality of air pockets.

4. The device of claim 1, wherein the haptic mechanism includes a plurality of haptic materials, wherein the plurality of haptic materials is operable to change the surface relief of the touch-sensitive surface by changing the physical sizes of the plurality of haptic materials.

5. The device of claim 1, wherein the surface relief includes bumps, holes, and a combination of bumps and holes.

6. The device of claim 1, wherein the touch-sensitive surface is a flexible and deformable surface that is capable of sensing touches on the touch-sensitive surface.

7. A method of controlling surface relief of a touch-sensitive surface with a haptic mechanism, the method comprising:
maintaining the touch-sensitive surface in a first surface characterization;
displaying, by a display, an image through the touch-sensitive surface and the haptic mechanism;
activating the haptic mechanism in response to an input command received from a user;
generating a first haptic feedback to change the surface relief of the touch-sensitive surface from the first surface characterization to a second surface characterization; and
generating a second haptic feedback to provide haptic acknowledgement to the user confirming the input command, wherein the haptic mechanism is a rigid layer having at least one surface feature that includes a plurality of pins positioned above the display and below the touch-sensitive surface and wherein generating the first haptic feedback comprises:

moving the haptic mechanism relative to the touch-sensitive surface to move a pin of the plurality of pins above the touch-sensitive surface or below the touch-sensitive surface through a hole of a plurality of holes in the touch-sensitive surface.

8. The method of claim 7, further comprising sensing a contact on the touch-sensitive surface using a capacitance sensor, generating an input signal in response to the contact, and sending the input signal to a processing unit.

9. The method of claim 7, wherein maintaining the touch-sensitive surface in the first surface characterization further includes maintaining bumps on the touch-sensitive surface.

10. The method of claim 7, wherein generating the first haptic feedback to change the touch-sensitive surface further includes creating a bump sensation on the surface relief of the touch-sensitive surface.

11. The method of claim 7, wherein generating the first haptic feedback to change the touch-sensitive surface further includes shifting the touch-sensitive surface laterally against the haptic mechanism to form a sensation of bumps and holes.

12. The method of claim 7, wherein generating the first haptic feedback to change the touch-sensitive surface further includes buckling the touch-sensitive surface to form a bump.

13. The method of claim 7, wherein generating the first haptic feedback to change the surface relief of the touch-sensitive surface from the first surface characterization to the second surface characterization further includes changing from a coarse texture to a smooth texture.

14. The method of claim 7, wherein generating the first haptic feedback to change the surface relief of the touch-sensitive surface from the first surface characterization to the second surface characterization further includes changing from a smooth texture to a rough texture.

15. A haptic interface device comprising:
display layer operable to display viewable images;
a touch screen layer disposed over the display layer and capable of receiving an input by sensing one or more surface contacts;
a haptic mechanism layer disposed over the touch screen layer and operable to provide haptic feedback in response to an activating command; and
a touch surface layer disposed over the haptic mechanism layer and having a plurality of openings, wherein the plurality of openings facilitate a change of surface relief of the touch surface layer from a smooth surface to a coarse surface in response to the activating command, wherein the viewable images displayed by the display layer are viewable through the touch screen layer, the haptic mechanism layer, and the touch surface layer,
wherein the haptic mechanism layer is operable to provide a first tactile feedback and a second tactile feedback, wherein the first tactile feedback causes the touch surface layer to change from the smooth surface to the coarse surface, and wherein the second tactile feedback includes a haptic user acknowledgement confirming the input, and wherein the haptic mechanism layer is a rigid layer having at least one surface feature that includes a plurality of pins positioned above the display layer and below the touch surface layer and wherein the haptic mechanism layer is operable to move relative to the touch surface layer to provide the first tactile feedback and wherein moving the haptic mechanism layer moves a pin of the plurality of pins above the touch surface layer or below the touch surface layer through an opening of the plurality of openings in the touch surface layer.

16. The device of claim 15, wherein the coarse surface includes bumps, holes, and a combination of bumps and holes.

17. The device of claim 15, wherein the touch surface layer is a flexible and deformable surface capable of forming a raised surface in response to one or more features of haptic mechanism layer.

18. The device of claim 15, wherein the activating command is generated when a sensor detects the input on the touch surface layer.

19. The device of claim 1, wherein the display is a liquid crystal display or a plasma flat panel display.

20. The device of claim 1, further comprising a touch screen disposed in between the display and the haptic mechanism.

21. The device of claim 20, wherein the touch screen comprises sensors configured to sense the user input selection on the touch-sensitive surface.

22. The device of claim 1, wherein the touch-sensitive surface comprises sensors configured to sense the user input selection.

23. The device of claim 1, wherein the second tactile feedback comprises vibrotactile feedback.

24. The method of claim 7, wherein generating the second haptic feedback comprises generating a vibration.

25. The device of claim 15, wherein the second tactile feedback comprises vibrotactile feedback.

26. The device of claim 1, wherein the haptic mechanism includes multiple haptic controllable cells wherein each cell supports a pin.

27. The method of claim 7, wherein the haptic mechanism includes multiple haptic controllable cells wherein each cell supports a pin.

28. The device of claim 15, wherein the haptic mechanism layer includes multiple haptic controllable cells wherein each cell supports a pin.

29. The device of claim 1, wherein the pins cause a button-like sensation on the touch-sensitive surface when the pins move above the touch-sensitive surface and cause a hole sensation on the touch-sensitive surface when the pins move below the touch-sensitive surface.

30. The method of claim 7, wherein moving the haptic mechanism relative to the touch-sensitive surface to move the pin of the plurality of pins above the touch-sensitive surface through the hole of the plurality of holes in the touch-sensitive surface causes a button-like sensation on the touch-sensitive surface and moving the haptic mechanism relative to the touch-sensitive surface to move the pin of the plurality of pins below the touch-sensitive surface through the hole of the plurality of holes in the touch-sensitive surface causes a hole sensation on the touch-sensitive surface.

31. The device of claim 15, wherein the pins cause a button-like sensation on the touch surface layer when the pins move above the touch surface layer and cause a hole sensation on the touch surface layer when the pins move below the touch surface layer.

* * * * *